(12) United States Patent
Yoon et al.

(10) Patent No.: US 9,343,713 B2
(45) Date of Patent: May 17, 2016

(54) BATTERY CELL HAVING IMPROVED THERMAL STABILITY AND MIDDLE OR LARGE-SIZED BATTERY MODULE EMPLOYED WITH THE SAME

(75) Inventors: Hee Soo Yoon, Daejeon (KR); Shinichi Jinushi, Daejeon (KR); Jin Kyu Lee, Busan (KR); Dal Moh Kang, Daejeon (KR); Jongmoon Yoon, Daejeon (KR)

(73) Assignee: LG CHEM, LTD., Seoul (KR)

( * ) Notice: Subject to any disclaimer, the term of this patent is extended or adjusted under 35 U.S.C. 154(b) by 1361 days.

(21) Appl. No.: 12/742,021

(22) PCT Filed: Oct. 22, 2008

(86) PCT No.: PCT/KR2008/006250
§ 371 (c)(1),
(2), (4) Date: Sep. 14, 2010

(87) PCT Pub. No.: WO2009/061088
PCT Pub. Date: May 14, 2009

(65) Prior Publication Data
US 2011/0008665 A1    Jan. 13, 2011

(30) Foreign Application Priority Data
Nov. 9, 2007   (KR) .................. 10-2007-0114030

(51) Int. Cl.
*H01M 2/02*   (2006.01)
*H01M 2/06*   (2006.01)
*H01M 2/08*   (2006.01)
*H01M 10/50*   (2006.01)
*H01M 10/625*   (2014.01)
*H01M 10/653*   (2014.01)
(Continued)

(52) U.S. Cl.
CPC ............ *H01M 2/0265* (2013.01); *H01M 2/065* (2013.01); *H01M 2/08* (2013.01); *H01M 10/613* (2015.04); *H01M 10/625* (2015.04); *H01M 10/647* (2015.04); *H01M 10/653* (2015.04); *H01M 10/6551* (2015.04); *H01M 10/6556* (2015.04); *H01M 10/6562* (2015.04); *H01M 10/6567* (2015.04); *H01M 2/0207* (2013.01); *H01M 2/0287* (2013.01)

(58) Field of Classification Search
USPC ........... 429/120, 163–187, 96–100, 149–160; 29/623.1–623.5
See application file for complete search history.

(56) References Cited

U.S. PATENT DOCUMENTS

| 6,087,036 A | 7/2000 | Rouillard et al. |
| 2002/0061436 A1 | 5/2002 | Inagaki et al. |

(Continued)

FOREIGN PATENT DOCUMENTS

| CN | 1347162 A | 5/2002 |
| JP | 2000-133215 A | 5/2000 |

(Continued)

*Primary Examiner* — Basia Ridley
*Assistant Examiner* — Caitlin Wilmot
(74) *Attorney, Agent, or Firm* — Birch, Stewart, Kolasch & Birch, LLP

(57) ABSTRACT

Disclosed herein is a battery cell constructed in a structure in which an electrode assembly of a cathode/separator/anode structure is mounted in a battery case formed of a laminate sheet including a resin layer and a metal layer while the electrode assembly is connected to electrode terminals extruding out of the battery case, wherein the battery case is provided at an outer circumferential end thereof with a sealing part formed by thermally welding upper and lower parts of the laminate sheet, and a sheet-type member ('a thermally conductive sheet') to accelerate the dissipation of heat from the battery cell extends to the sealing part while the thermally conductive sheet partially covers the battery cell.

15 Claims, 4 Drawing Sheets

(51) Int. Cl.
*H01M 10/647* (2014.01)
*H01M 10/6556* (2014.01)
*H01M 10/6551* (2014.01)
*H01M 10/6567* (2014.01)
*H01M 10/613* (2014.01)
*H01M 10/6562* (2014.01)

(56) References Cited

U.S. PATENT DOCUMENTS

| | | |
|---|---|---|
| 2005/0110460 A1 | 5/2005 | Arai et al. |
| 2006/0216583 A1 | 9/2006 | Lee et al. |
| 2006/0275658 A1* | 12/2006 | Sanada et al. ............... 429/185 |
| 2006/0286450 A1* | 12/2006 | Yoon et al. ............... 429/180 |
| 2009/0208828 A1* | 8/2009 | Kanai et al. ............... 429/120 |

FOREIGN PATENT DOCUMENTS

| | | | |
|---|---|---|---|
| JP | 2003-297303 A | 10/2003 | |
| JP | 2004-47262 A | 2/2004 | |
| JP | 2004-71179 A | 3/2004 | |
| JP | 2004-103258 A | 4/2004 | |
| JP | 2007-42453 A | 2/2007 | |
| JP | WO2006135008 * | 12/2007 | ............... 429/120 |

* cited by examiner

BATTERY CELL HAVING IMPROVED THERMAL STABILITY AND MIDDLE OR LARGE-SIZED BATTERY MODULE EMPLOYED WITH THE SAME

TECHNICAL FIELD

The present invention relates to a battery cell having improved thermal stability, and, more particularly, to a battery cell constructed in a structure in which an electrode assembly of a cathode/separator/anode structure is mounted in a battery case formed of a laminate sheet including a resin layer and a metal layer while the electrode assembly is connected to electrode terminals extruding out of the battery case, wherein the battery case is provided at an outer circumferential end thereof with a sealing part formed by thermally welding upper and lower parts of the laminate sheet, and a sheet-type member ('a thermally conductive sheet') to accelerate the dissipation of heat from the battery cell extends to the sealing part while the thermally conductive sheet partially covers the battery cell.

BACKGROUND ART

As mobile devices have been increasingly developed, and the demand of such mobile devices has increased, the demand of secondary batteries has also sharply increased. Among them is a lithium secondary battery having high energy density and operating voltage and excellent preservation and service-life characteristics, which has been widely used as an energy source for various electronic products as well as for the mobile devices.

Based on their external and internal structures, secondary batteries are generally classified into a cylindrical battery, a prismatic battery, and a pouch-shaped battery. Especially, the prismatic battery and the pouch-shaped battery, which can be stacked with high integration and have a small width to length ratio, have attracted considerable attention.

Also, the secondary batteries have attracted considerable attention as an energy source for electric vehicles and hybrid electric vehicles, which have been developed to solve problems, such as air pollution, caused by existing gasoline and diesel vehicles using fossil fuel. As a result, kinds of applications using the secondary batteries are being increased owing to advantages of the secondary batteries, and hereafter the secondary batteries are expected to be applied to more applications and products than now.

As kinds of applications and products, to which the secondary batteries are applicable, are increased, kinds of batteries are also increased such that the batteries can provide powers and capacities corresponding to the various applications and products. Furthermore, there is a strong need to reduce the sizes and weights of the batteries applied to the corresponding applications and products.

For example, small-sized mobile devices, such as mobile phones, personal digital assistants (PDA), digital cameras, and laptop computers, use one or several small-sized, light-weighted battery cells for each device according to the reduction in size and weight of the corresponding products. On the other hand, middle- or large-sized devices, such as electric vehicles and hybrid electric vehicles, use a middle- or large-sized battery module (which may be referred to as "a battery pack") having a plurality of battery cells electrically connected with each other because high power and large capacity is necessary for the middle- or large-sized devices. The size and weight of the battery module is directly related to the receiving space and power of the corresponding middle- or large-sized device. For this reason, manufacturers are trying to manufacture small-sized, light-weighted battery modules.

Meanwhile, as battery cells are connected to one another, while the battery cells are stacked, to increase the capacities of battery modules, the dissipation of heat from the battery cells becomes serious. Heat is generated from lithium secondary batteries during the charge and discharge of the lithium secondary batteries. If the heat is not effectively removed, the heat accumulates in the respective lithium secondary batteries, with the result that the deterioration of the secondary batteries is caused, and the safety of the secondary batteries is greatly lowered. In particular, for a battery requiring high-speed charging and discharging characteristics as in a power source for electric vehicles and hybrid electric vehicles, a large amount of heat is generated from the battery at the time when the battery instantaneously provides high power.

Also, a laminate type battery case of a pouch-shaped battery cell widely used in the battery module is coated with a polymer material exhibiting low heat conductivity, with the result that it is difficult to effectively lower the overall temperature of the battery.

In connection with this matter, for example, Korean Patent Application Publication No. 2006-0034130 discloses a sheathing member for batteries including a metal plate having a first surface which is approximately flat and a second surface which is approximately flat, the second surface being opposite to the first surface, a heat dissipation layer formed on the first surface of the metal plate to a predetermined thickness, and a cast propylene (CPP) layer formed on the second surface of the metal plate to a predetermined thickness. That is, the disclosed sheathing member for batteries is constructed in a structure in which the CPP layer, the metal layer, and the heat dissipation layer are sequentially stacked from the inside of a battery. Consequently, an outer resin layer exhibiting excellent durability is substantially removed from the outer surface of a laminate-type battery case, with the result that the durability of the battery case may be lowered. In addition, an additional process for coating the heat dissipation layer is required, which complicates the manufacturing process.

Therefore, there is a high necessity for a technology that is capable of fundamentally solving the above-mentioned problems.

DISCLOSURE OF INVENTION

Technical Problem

Therefore, the present invention has been made to solve the above problems, and other technical problems that have yet to be resolved.

As a result of a variety of extensive and intensive studies and experiments on a cutting frame, the inventors of the present invention have developed a battery cell constructed in a structure in which a sheet-type member to accelerate the dissipation of heat from the battery cell extends to a sealing part formed at the outer circumferential end of a battery case while the sheet-type member partially covers the battery cell, and found that it is possible to effectively improve heat dissipation efficiency while not increasing the thickness of the battery cell. The present invention has been completed based on these findings.

Technical Solution

In accordance with one aspect of the present invention, the above and other objects can be accomplished by the provision of a battery cell constructed in a structure in which an electrode assembly of a cathode/separator/anode structure is mounted in a battery case formed of a laminate sheet including a resin layer and a metal layer while the electrode assembly is connected to electrode terminals extruding out of the battery case, wherein the battery case is provided at an outer circumferential end thereof with a sealing part formed by thermally welding upper and lower parts of the laminate sheet, and a sheet-type member ('a thermally conductive sheet') to accelerate the dissipation of heat from the battery cell extends to the sealing part while the thermally conductive sheet partially covers the battery cell.

In the battery cell according to the present invention, the thermally conductive sheet extends to the sealing part formed at the outer circumference end of the battery case while the thermally conductive sheet partially covers the battery cell. Consequently, heat generated from the battery cell due to ion occlusion/deocclusion reaction between a cathode active material and an anode active material during the charge and discharge of the battery cell is absorbed by the thermally conductive sheet, and then the absorbed heat is discharged out of the battery cell, whereby it is possible to maximize the heat dissipation efficiency of the battery cell.

The battery cell as described above is more preferably used in the structure of a battery module including a plurality of battery cells stacked. That is, when the battery cells are adjacent to each other, it is difficult to dissipate heat generated from the battery cells to the outside due to the tight contact between the respective battery cells, although heat exchange members, such as metal plates, are interposed between the respective battery cells. Even in the stacked structure, however, the sealing parts of the respective battery cells are not in tight contact with each other. According to the present invention, the thermally conductive sheet extends to the sealing part of the battery cell while the thermally conductive sheet covers the battery cell, whereby it is possible to achieve effective heat dissipation.

Also, the battery cell according to the present invention is constructed in a structure in which the thermally conductive sheet is thin, and the thin, thermally conductive sheet is in tight contact with the outer surface of the sealing part of the battery cell. Consequently, it is possible to stack a plurality of battery cells while not increasing the total thickness of the battery cells, thereby manufacturing a compact battery module.

According to the present invention, the battery cell is not particularly restricted so long as the battery cell is a secondary battery that can be charged and discharged. For example, a lithium secondary battery, a nickel-metal hydride (Ni-MH) secondary battery, or a nickel-cadmium (Ni—Cd) secondary battery may be used as the battery cell. Preferably, the lithium secondary battery is used as the battery cell, since the lithium secondary battery provides a high power to weight ratio.

Based on its shape, the lithium secondary battery may be classified as a cylindrical battery, a prismatic battery, or a pouch-shaped battery. The battery cell according to the present invention is applied to a battery having a sealing part thermally welded at an outer circumference end region thereof. In a preferred embodiment, the battery cell according to the present invention is a light-weighted pouch-shaped battery constructed in a structure in which an electrode assembly is mounted in a battery case formed of a laminate sheet including an inner resin layer, which is thermally weldable, an isolation metal layer, and an outer resin layer exhibiting excellent durability.

The thermally conductive sheet is not particularly restricted so long as the thermally conductive sheet is made of a material exhibiting excellent heat conductivity and is formed in a thin shape. Preferably, the thermally conductive sheet is formed of a metal or carbon plate, which exhibits heat conductivity higher than other materials, or a polymer film containing metal powder or carbon powder, which exhibits heat conductivity higher than other materials.

It is preferred for the thermally conductive sheet to be constructed in a structure to maximize a contact area between the thermally conductive sheet and the outer surface of the battery cell to maximize the heat dissipation efficiency. Therefore, the thermally conductive sheet may be formed of a metal plate which is bent according to the external shape of the battery cell to maximize a contact area between the metal plate and the battery cell.

The thermally conductive member may cover the outer surface (including the sealing part) of the battery cell in various fashions. For example, the thermally conductive member may cover the outer surface of the battery cell in a simple detachable tight contact fashion, in a mechanical coupling fashion, or in an adhesive fashion. Preferably, the thermally conductive member is attached to the outer surface of the battery cell by an adhesive. In this case, any general bonding agents may be used as the adhesive. According to circumstances, an additive to increase heat conductivity may be added to the adhesive.

When the thickness of the thermally conductive sheet is too large, the thickness and volume of a battery module may increase during the stacking of the battery cells to manufacture the battery module. On the other hand, when the thickness of the thermally conductive sheet is too small, it is difficult to expect a desired heat dissipation effect. For example, therefore, the thickness of the thermally conductive sheet may be equal to or greater than the thickness of the laminate sheet.

The thermally conductive sheet extending to the sealing part is preferably in tight contact with the sealing part to effectively achieve the dissipation of heat conducted from the outer surface of the battery cell.

In accordance with another aspect of the present invention, there is provided a battery cell constructed in a structure in which an electrode assembly of a cathode/separator/anode structure is mounted in a battery case formed of a laminate sheet including a resin layer and a metal layer while the electrode assembly is connected to electrode terminals extruding out of the battery case, wherein the laminate sheet includes an inner resin layer, an isolation metal layer, and an outer resin layer, and the isolation metal layer has a predetermined thickness sufficient to accelerate the dissipation of heat from the battery cell or is made of a material to accelerate the dissipation of heat from the battery cell ('a thermally conductive accelerating material').

In the battery cell according to the present invention, the isolation metal layer of the laminate sheet has the predetermined thickness or is made of the thermally conductive accelerating material, with the result that it is possible to improve the heat dissipation efficiency of the battery case. Also, it is not necessary to provide an additional heat exchange member to improve the heat dissipation at the outside of the battery case, whereby it is possible to manufacture a battery cell which is compact in the aspect of volume and has an excellent volume efficiency.

Generally, the isolation metal layer, interposed between the inner resin layer and the outer resin layer, maintains the shape of the battery case, protects the interior of the battery case from external impact and pressure, and accelerates thermal diffusion between the inner resin layer and the outer resin layer, which are made of a polymer material exhibiting low heat conductivity.

Consequently, it is preferred for the isolation metal layer to have a thickness sufficient to optimize the strength of the battery cell and the heat dissipation efficiency while not increasing the thickness and volume of the battery cell. For example, the isolation metal layer may have a thickness of 50 to 250 μm, which is greater than that of a metal layer of a conventional battery cell.

Meanwhile, the thermally conductive accelerating material is not particularly restricted so long as the thermally conductive accelerating material exhibits a predetermined strength and heat dissipation property. Preferably, the thermally conductive accelerating material is copper or carbon.

In accordance with another aspect of the present invention, there is provided a battery cell constructed in a structure in which an electrode assembly of a cathode/separator/anode structure is mounted in a battery case formed of a laminate sheet including a resin layer and a metal layer while the electrode assembly is connected to electrode terminals extruding out of the battery case, wherein the battery case is provided at an outer circumferential end thereof with a sealing part formed by thermally welding upper and lower parts of the laminate sheet, and at least some of the sealing part of the battery case where the electrode terminals are not formed extends such that the at least some of the sealing part is longer than the remaining sealing part.

That is, the battery cell is constructed in a structure in which at least some of the sealing part formed at the outer circumferential end of the battery case by thermal welding extends, such that the at least some of the sealing part is longer than the remaining sealing part, to improve the heat dissipation. In a battery module including a plurality of battery cells stacked in tight contact fashion as previously described, therefore, it is possible to more effectively achieve the heat dissipation through sealing parts which are not in tight contact with each other.

Also, it is possible to improve the heat dissipation efficiency of the battery cell only by extending a portion of the sealing part such that the portion of the sealing part is longer than the remaining sealing part without the attachment of an additional heat exchange member to the battery cell, whereby no additional manufacturing process is required.

In this structure, it is preferred for the size of the extending sealing part to be appropriately adjusted within a range in which the heat dissipation efficiency of the battery cell is maximized while the total volume of the battery cell is not increased. For example, therefore, the extending sealing part may have an extension length equivalent to 150 to 400% of the width of the remaining sealing part.

The extending sealing part may be equivalent to more than 50%, preferably more than 70%, of the length of the sealing part of the battery cell where the extending sealing part is formed. The extending sealing part may extend in a single continuous structure or in two or more discontinuous structures in the longitudinal direction of the sealing part.

Meanwhile, a plurality of battery cells are stacked to construct a middle- or large-sized battery module such that the middle- or large-sized battery module provides high power and large capacity. The battery cells, used as unit cells of the battery module, are required to exhibit higher heat dissipation efficiency, which is necessary to secure the safety of the battery module.

In a preferred embodiment, therefore, a battery case constituting each battery cell is provided at at least one side sealing part thereof with a member to accelerate the dissipation of heat from the battery cell ('a heat exchange member'). That is, the heat exchange member is provided at one side sealing part or each side sealing part of the battery case, whereby it is possible to further accelerate the heat dissipation of the battery cell while not increasing the thickness of the battery cell.

In this structure, the heat exchange member may be a thermally conductive member having a heat exchange medium channel through which a heat exchange medium, such as water, flows. As a result, the heat dissipation of the battery cell is further accelerated. Preferably, the heat exchange member includes a pair of metal or carbon bars each having the heat exchange medium channel formed therein, the metal or carbon bars being mounted to a top and bottom of the sealing part.

The provision of the bars is particularly preferred because the bars improve the heat dissipation effect of a middle- or large-sized battery module including a plurality of battery cells stacked and, at the same time, serve as structural bodies to maintain the staked state of the battery cells. In consideration of a fact that the bars serve as such structural bodies, the heat exchange member may have a height equal to or greater than a height of each battery cell when the heat exchange member is mounted to the sealing part.

In accordance with yet another aspect of the present invention, there is provided a middle- or large-sized battery module having a high power and large capacity, wherein the battery module includes the above-described battery cells as unit cells.

In a preferred embodiment, the battery module is constructed in a structure in which heat exchange members of a predetermined height are mounted at opposite side sealing parts of the respective battery cells, and the stacked state of the battery cells is maintained by the heat exchange members.

In the battery module constructed in the above-described structure, as previously described, the heat exchange members, of the predetermined height, mounted at the opposite side sealing parts of the respective battery cells not only absorb heat generated from the battery cells and discharge the absorbed heat to the outside but also serve as structural bodies to support the stacked battery cells.

The middle- or large-sized battery module according to the present invention may be used as a power source for devices which require high-power and large-capacity electricity and to which external forces, such as vibration and impact, are applied. Preferably, the middle- or large-sized battery module is used as a power source for electric vehicles or hybrid electric vehicles.

The structure of the middle- or large-sized battery module and a method of manufacturing the middle- or large-sized battery module are well known in the art to which the present invention pertains, and therefore, a detailed description thereof will not be given.

BRIEF DESCRIPTION OF THE DRAWINGS

The above and other objects, features and other advantages of the present invention will be more clearly understood from the following detailed description taken in conjunction with the accompanying drawings, in which.

MODE FOR THE INVENTION

Now, preferred embodiments of the present invention will be described in detail with reference to the accompanying drawings. It should be noted, however, that the scope of the present invention is not limited by the illustrated embodiments.

Figure 1:
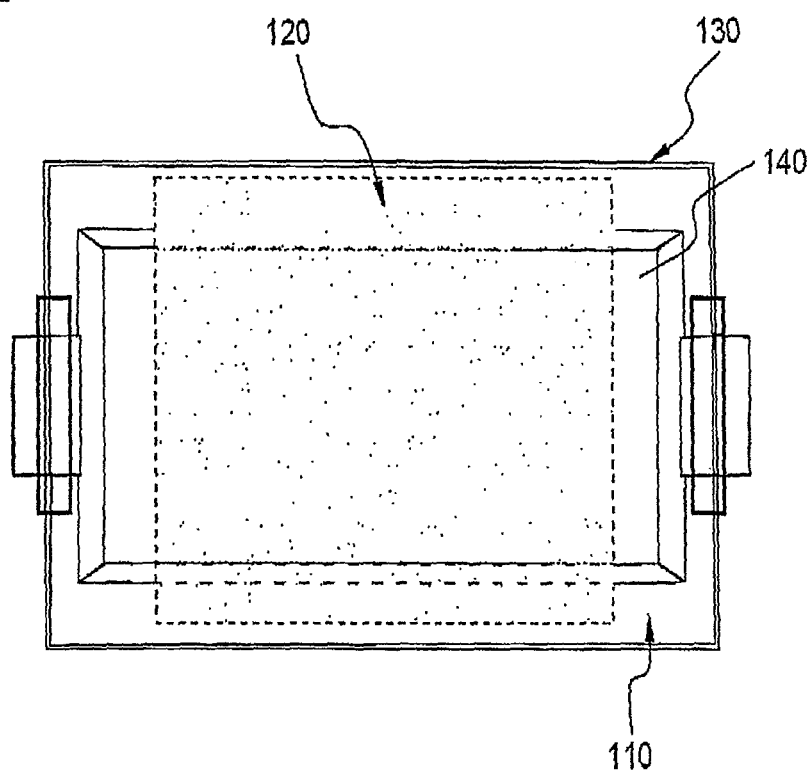
FIG. 1 is a plan view typically illustrating a battery cell according to a preferred embodiment of the present invention.

FIG. 1 is a plan view typically illustrating a battery cell according to a preferred embodiment of the present invention.

Referring to FIG. 1, a sealing part 110, formed by thermally welding laminate sheets, is located at the outer circumferential end of the battery cell 100, and a thermally conductive sheet 120, made of metal, extends to the sealing part 110 of the battery cell 100, while the thermally conductive sheet 120 is attached to a specific region of the outer surface of a battery case 130, to accelerate the dissipation of heat from the battery cell 100. Particularly in a middle- or large-sized battery module including a plurality of battery cells 100 stacked while being in tight contact with each other, heat generated from electrode assemblies 140 mounted in respective battery cases 130 are discharged to the outside through sealing parts 110, which are not in tight contact with each other, since the thermally conductive sheet 120 is tightly attached to the outer surface of the battery case 130 and the sealing part 110.

Figure 2:
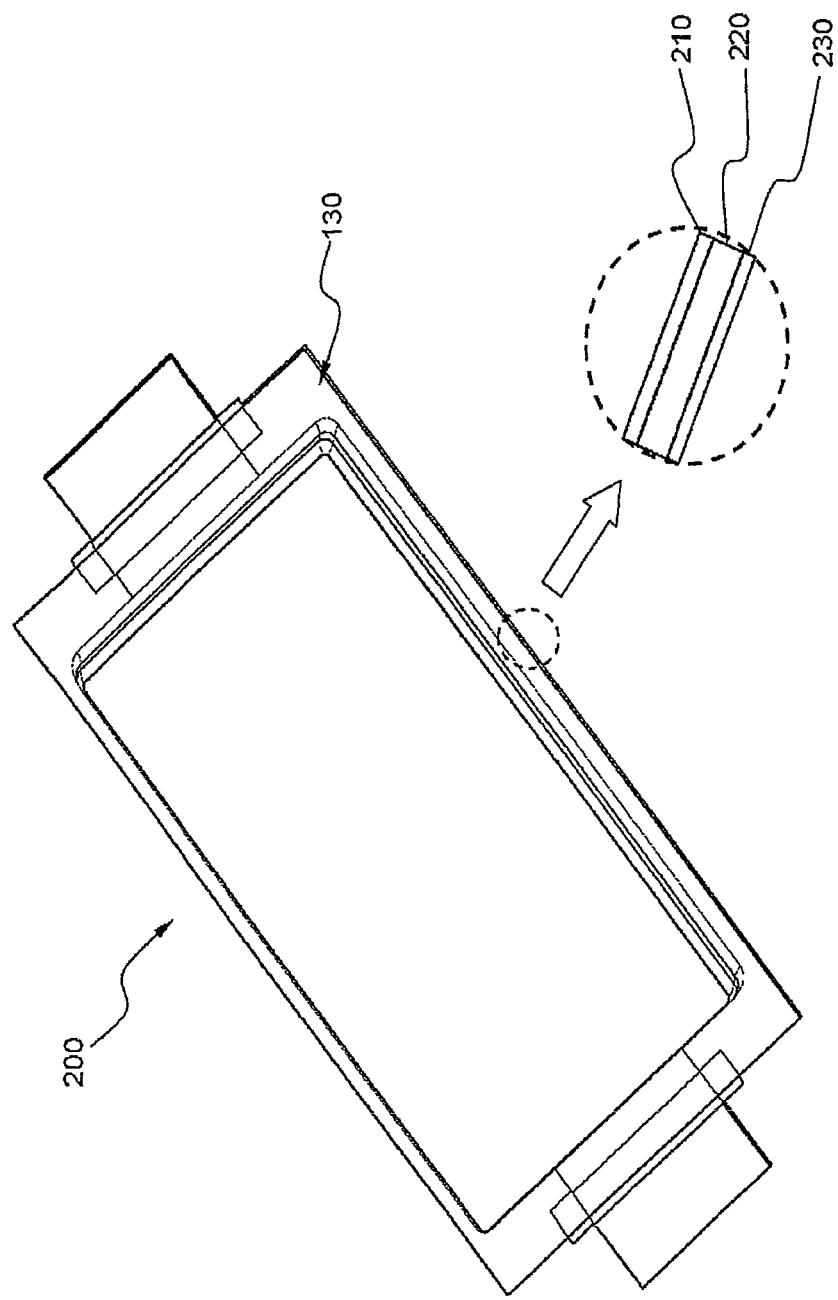
FIG. 2 is a view typically illustrating a battery cell according to another preferred embodiment of the present invention.

FIG. 2 is a view typically illustrating a battery cell according to another preferred embodiment of the present invention.

Referring to FIG. 2, each laminate sheet 130 of the battery cell 200 includes an inner resin layer 210, an isolation metal layer 220, and an outer resin layer 230. The isolation metal layer 220 is a copper layer 220 exhibiting heat conductivity higher than that of a conventional aluminum layer. Consequently, a low heat dissipation phenomenon caused by the inner resin layer 210 and the outer resin layer 230, which are made of polymer resin, is effectively compensated for by the copper layer 220.

Figure 3:
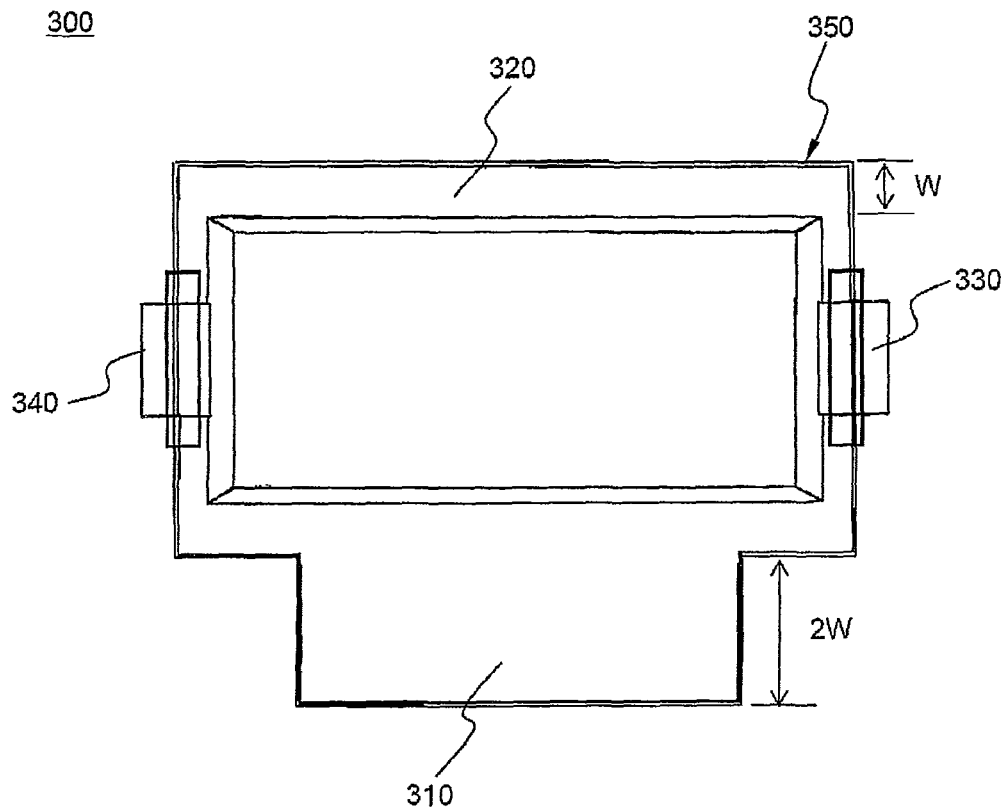
FIG. 3 is a plan view typically illustrating a battery cell according to yet another preferred embodiment of the present invention.

FIG. 3 is a plan view typically illustrating a battery cell according to yet another preferred embodiment of the present invention.

The battery cell 300 of FIG. 3 is constructed in a structure in which at one side sealing part 310 of a battery case 350 where electrode terminals 330 and 340 are not located extends outward from the battery cell 300 such that the one side sealing part 310 has a size 2W equivalent to approximately twice the width W of the remaining sealing part 320.

Figure 4:
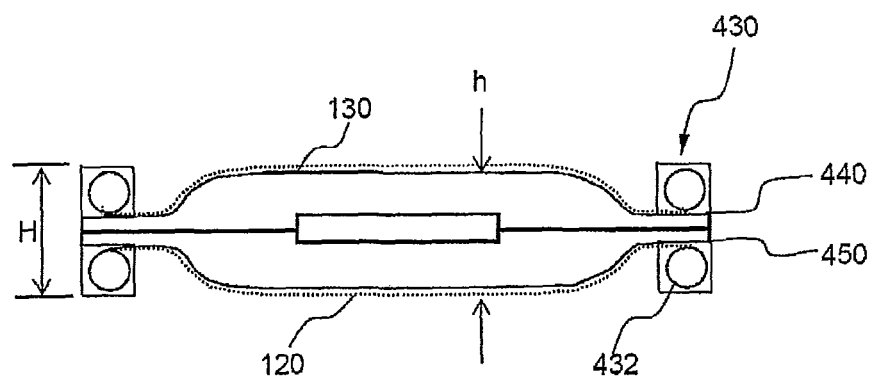
FIG. 4 is a vertical sectional view typically illustrating a battery cell constructed in a structure in which a heat exchange member is coupled to a sealing part of the battery cell of FIG. 1.

FIG. 4 is a vertical sectional view typically illustrating a battery cell constructed in a structure in which a heat exchange member is coupled to the sealing part of the battery cell of FIG. 1.

The battery cell 400 of FIG. 4 is constructed in a structure in which the thermally conductive sheet 120 partially covers the outer surface of the battery case 130, and a pair of metal bars 430 are mounted to the top 440 and the bottom 450 of the sealing part at each side sealing part of the battery case 130.

In each metal bar 430 is formed a heat exchange medium channel 432 through which a heat exchange medium flows.

When the metal bars 430 are mounted to the top 440 and the bottom 450 of the sealing part of the battery cell 400, the metal bars 430 have a total height H approximately equal to the height h of the battery cell 400.

Figure 5:
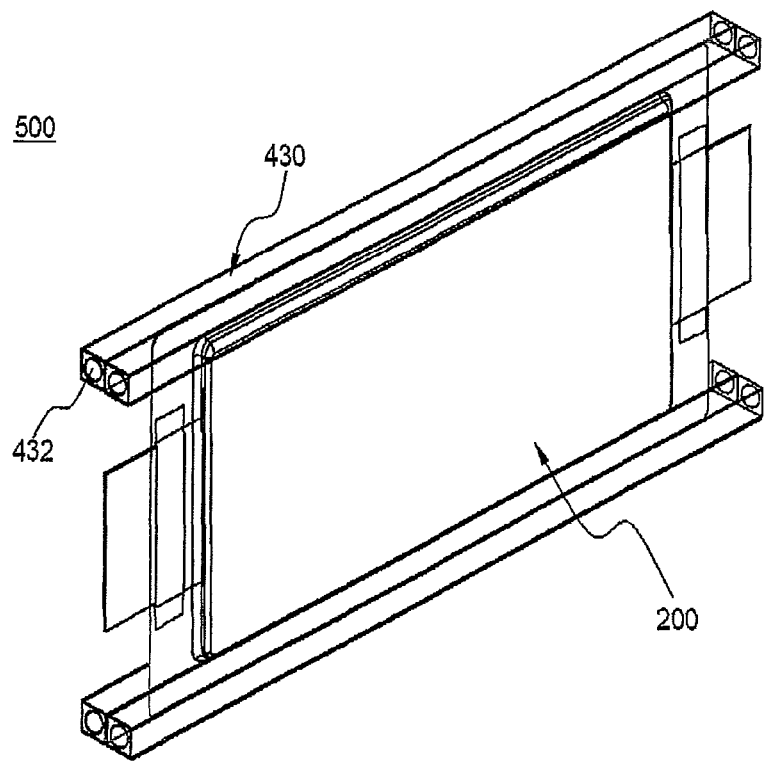
FIG. 5 is a vertical sectional view typically illustrating a battery cell constructed in a structure in which a heat exchange member is coupled to a sealing part of the battery cell of FIG. 2.

FIG. 5 is a vertical sectional view typically illustrating a battery cell 500 constructed in a structure in which a heat exchange member 430 is coupled to the sealing part of the battery cell 200 of FIG. 2.

The battery cell 500 of FIG. 5 is identical in construction to the battery cell of FIG. 4 except that each laminate sheet of the battery cell includes the copper layer, and therefore, a detailed description thereof will not be given.

In the battery cell structure of FIG. 3 as well as the battery cell structures of FIGS. 4 and 5, it is possible to extend the other side sealing part in addition to the one side sealing part, and it is possible to mount the metal bars 430 of FIG. 4 or 5 to the opposite side sealing parts.

Figure 6:
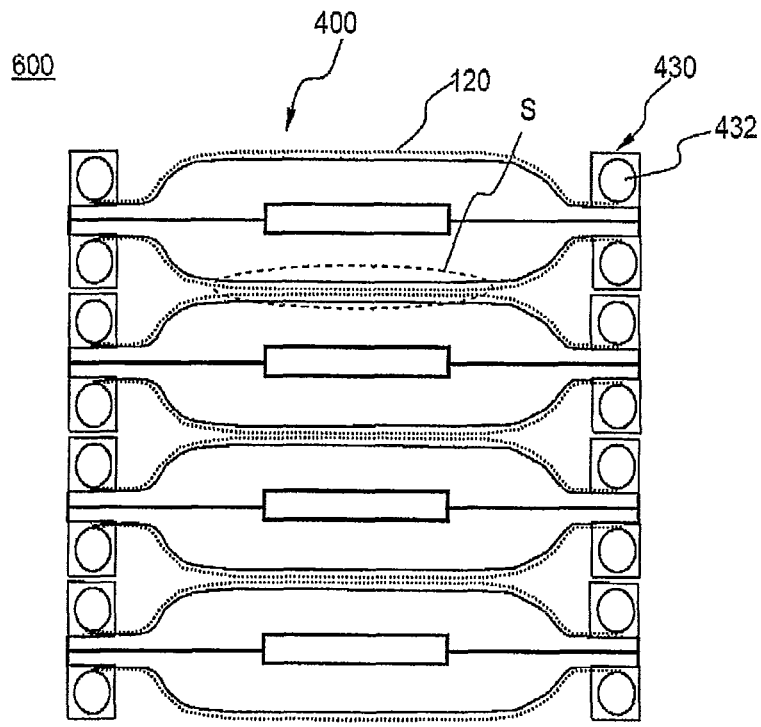
FIG. 6 is a vertical sectional view typically illustrating a middle- or large-sized battery module including a plurality of battery cells, one of which is illustrated in FIG. 4, stacked.

FIG. 6 is a vertical sectional view typically illustrating a middle- or large-sized battery module including a plurality of battery cells, one of which is illustrated in FIG. 4, stacked.

Referring to FIG. 6, the middle- or large-sized battery module 600 is constructed in a structure in which the metal bars 430 are mounted to opposite side sealing parts of the battery cells 400. These metal bars 430 serves as structural bodies for maintaining the stacked state of the battery cells 400.

Also, the battery module 600 is constructed in a structure in which the thermally conductive sheet 120 covers the outer surface of each battery cell 400, the metal bars 430, each of which has the heat exchange medium channel 432 formed therein, are mounted at the sealing parts of the battery cells 400. Consequently, spaces S defined between the neighboring battery cells 400 to form additional air passages are minimized, unlike a conventional air-cooling type middle- or large-sized battery module (not shown), whereby it is possible to manufacture the battery module 600 in a more compact structure and to achieve high heat dissipation efficiency.

INDUSTRIAL APPLICABILITY

As apparent from the above description, the battery cell according to the present invention is constructed in a structure in which the sheet-type member ('thermally conductive sheet') to accelerate the dissipation of heat from the battery cell extends to the sealing part formed at the outer circumferential end of the battery case while the thermally conductive sheet partially covers the battery cell. Consequently, it is possible to effectively improve heat dissipation efficiency while not increasing the thickness of the battery cell. Owing to the improved heat dissipation efficiency, it is possible to uniformly control the internal temperature of the battery cell, thereby greatly improving the life span and safety of the battery cell.

Although the preferred embodiments of the present invention have been disclosed for illustrative purposes, those skilled in the art will appreciate that various modifications, additions and substitutions are possible, without departing from the scope and spirit of the invention as disclosed in the accompanying claims.

The invention claimed is:

1. A battery cell comprising:
    an electrode assembly of a cathode/separator/anode structure mounted in a central part of a battery case formed of a laminate sheet including a resin layer and a metal layer while the electrode assembly is connected to electrode terminals extruding out of the battery case;

a sealing part at an outer circumferential end of the central part of the battery case, the sealing part formed by thermally welding upper and lower parts of the laminate sheet; and a sheet-type member ('a thermally conductive sheet') to accelerate the dissipation of heat from the battery cell extending to the sealing part while the thermally conductive sheet partially covers the battery cell, wherein the thermally conductive sheet is formed of a metal plate which is bent according to an external shape of the battery cell to maximize a contact area between the metal plate and the battery cell, wherein the battery case is provided at at least one side sealing part thereof with heat exchange members, wherein the heat exchange members are thermally conductive members having a heat exchange medium channel through which a heat exchange medium flows, the heat exchange members comprising an upper heat exchange member contacting an upper surface of the sealing part and a lower heat exchange member contacting a lower surface of the sealing part, and wherein a combined height of the upper heat exchange member, lower heat exchange member and sealing part is equal to a height of the central part of the battery case.

2. The battery cell according to claim 1, wherein the laminate sheet includes an inner resin layer, which is thermally weldable, an isolation metal layer, and an outer resin layer exhibiting excellent durability.

3. The battery cell according to claim 1, wherein the thermally conductive sheet is attached to an outer surface of the battery cell by an adhesive.

4. A battery cell comprising:

an electrode assembly of a cathode/separator/anode structure mounted in a central part of a battery case formed of a laminate sheet including a resin layer and a metal layer while the electrode assembly is connected to electrode terminals extruding out of the battery case; and a sealing part at an outer circumferential end of the central part of the battery case, the sealing part formed by thermally welding upper and lower parts of the laminate sheet, wherein the laminate sheet includes an inner resin layer, an isolation metal layer, and an outer resin layer, and the isolation metal layer has a predetermined thickness sufficient to accelerate the dissipation of heat from the battery cell or is made of a material to accelerate the dissipation of heat from the battery cell ('a thermally conductive accelerating material'), wherein a sheet-type member ('a thermally conductive sheet') to accelerate the dissipation of heat from the battery cell extends to the sealing part while the thermally conductive sheet partially covers the battery cell, wherein the thermally conductive sheet is formed of a metal plate which is bent according to an external shape of the battery cell to maximize a contact area between the metal plate and the battery cell, wherein the battery case is provided at at least one side sealing part thereof with heat exchange members, wherein the heat exchange members are thermally conductive members having a heat exchange medium channel through which a heat exchange medium flows, the heat exchange members comprising an upper heat exchange member contacting an upper surface of the sealing part and a lower heat exchange member contacting a lower surface of the sealing part, and wherein a combined height of the upper heat exchange member, lower heat exchange member and sealing part is equal to a height of the central part of the battery case.

5. The battery cell according to claim 4, wherein the thermally conductive accelerating material is copper or carbon.

6. A battery cell comprising:

an electrode assembly of a cathode/separator/anode structure mounted in a central part of a battery case formed of a laminate sheet including a resin layer and a metal layer while the electrode assembly is connected to electrode terminals extruding out of the battery case;

a sealing part provided at an outer circumferential end of the central part of the battery case, the sealing part formed by thermally welding upper and lower parts of the laminate sheet, and at least some of the sealing part of the battery case where the electrode terminals are not formed extends such that the at least some of the sealing part is longer than the remaining sealing part; and a sheet-type member ('a thermally conductive sheet') to accelerate the dissipation of heat from the battery cell extending to the sealing part while the thermally conductive sheet partially covers the battery cell, wherein the thermally conductive sheet is formed of a metal plate which is bent according to an external shape of the battery cell to maximize a contact area between the metal plate and the battery cell, wherein the battery case is provided at at least one side sealing part thereof with heat exchange members, wherein the heat exchange members are thermally conductive members having a heat exchange medium channel through which a heat exchange medium flows, the heat exchange members comprising an upper heat exchange member contacting an upper surface of the sealing part and a lower heat exchange member contacting a lower surface of the sealing part, wherein a combined height of the upper heat exchange member, lower heat exchange member and sealing part is equal to a height of the central part of the battery case.

7. The battery cell according to claim 6, wherein the extending sealing part has an extension length equivalent to 150 to 400% of the width of the remaining sealing part.

8. The battery cell according to claim 1, wherein the heat exchange member includes a pair of metal or carbon bars each having the heat exchange medium channel formed therein, the metal or carbon bars being mounted to a top and bottom of the sealing part.

9. The battery cell according to claim 8, wherein the heat exchange member has a height equal to or greater than a height of the battery cell when the heat exchange member is mounted to the sealing part.

10. A middle- or large-sized battery module having a high power and large capacity, wherein the battery module includes battery cells according to claim 1 as unit cells.

11. The middle- or large-sized battery module according to claim 10, wherein heat exchange members of a predetermined height are mounted at opposite side sealing parts of the respective battery cells, and the stacked state of the battery cells is maintained by the heat exchange members.

12. The middle- or large-sized battery module according to claim 11, wherein the battery module is used as a power source for electric vehicles or hybrid electric vehicles.

13. The battery cell according to claim 1, wherein the heat exchange member extends in a length direction of the battery case and is longer than the battery case in the length direction.

14. The battery cell according to claim 4, wherein the heat exchange member extends in a length direction of the battery case and is longer than the battery case in the length direction.

15. The battery cell according to claim 6, wherein the heat exchange member extends in a length direction of the battery case and is longer than the battery case in the length direction.

* * * * *